(12) United States Patent
Aldrich et al.

(10) Patent No.: US 7,640,176 B1
(45) Date of Patent: Dec. 29, 2009

(54) INSURANCE AGENT CONTACT SYSTEM

(75) Inventors: Steven P. Aldrich, Alexandria, VA (US);
Mark T. McCrery, Alexandria, VA (US); Slawek I. Ligier, Fairfax, VA (US); Timothy J. Froemling, Arlington, VA (US); Adrienne Fetrow, Columbia, MD (US)

(73) Assignee: Insweb Corporation, Gold River, CA (US)

( * ) Notice: Subject to any disclaimer, the term of this patent is extended or adjusted under 35 U.S.C. 154(b) by 1160 days.

(21) Appl. No.: 09/315,141

(22) Filed: May 20, 1999

(51) Int. Cl.
*G06Q 40/00* (2006.01)
(52) U.S. Cl. ................... 705/4; 705/37; 705/26
(58) Field of Classification Search .......... 705/4, 705/26, 37, 7, 80; 709/229, 203
See application file for complete search history.

(56) References Cited

U.S. PATENT DOCUMENTS

| | | | |
|---|---|---|---|
| 5,191,522 A | 3/1993 | Bosco et al. | |
| 5,231,571 A | 7/1993 | D'Agostino | |
| 5,414,621 A | 5/1995 | Hough | |
| 5,429,506 A | 7/1995 | Brophy et al. | |
| 5,606,496 A | 2/1997 | D'Agostino | |
| 5,655,085 A | 8/1997 | Ryan et al. | |
| 5,806,042 A | 9/1998 | Kelly et al. | |
| 5,809,478 A * | 9/1998 | Greco et al. | 705/4 |
| 5,842,178 A | 11/1998 | Giovannoli | |
| 5,873,066 A * | 2/1999 | Underwood et al. | 705/4 |
| 5,890,129 A | 3/1999 | Spurgeon | |
| 5,913,198 A | 6/1999 | Banks | |
| 5,914,951 A * | 6/1999 | Bentley et al. | 370/352 |
| 6,014,629 A * | 1/2000 | DeBruin-Ashton | 705/2 |
| 6,014,644 A * | 1/2000 | Erickson | 705/37 |
| 6,138,139 A * | 10/2000 | Beck et al. | 705/26 X |
| 6,199,099 B1 * | 3/2001 | Gershman et al. | 709/203 |
| 6,269,349 B1 * | 7/2001 | Aieta et al. | 705/80 |
| 6,327,570 B1 * | 12/2001 | Stevens | 705/7 |
| 6,697,824 B1 * | 2/2004 | Bowman-Amuah | 709/229 |

OTHER PUBLICATIONS

Tauhert, "The Intranet and Extranet Advantage" Insurance and Technology v22 n8 p. 26-32, Aug. 1997.*

(Continued)

*Primary Examiner*—Gerald J. O'Connor
*Assistant Examiner*—Natalie A. Pass
(74) *Attorney, Agent, or Firm*—Campbell Stephenson LLP

(57) ABSTRACT

An online insurance information system comprises an insurance quoting system, an agent contact system, agent systems, and customer systems. The agent contact system comprises a customer interfacing subsystem, a create contact engine, an agent interfacing subsystem, and a process contact engine. The customer interfacing subsystem is coupled to the quoting system and to a given one of the customer systems for receiving an online indication by a given customer of a desire to pursue a policy with a given agent. The given customer comprises a given contact. The create contact engine identifies the given agent system and saves in a database local to the agent contact system a personal insurance profile and contact information corresponding to the given customer. The agent interfacing subsystem coupled to the given agent system receives an online indication by the given agent of a desire to view, print, or modify the contact information. The process contact engine contacts the given agent system with information regarding the given contact, and accesses and modifies the contact information in accordance with online indications made by the agent.

7 Claims, 5 Drawing Sheets

OTHER PUBLICATIONS

Hersch, "Web-based Call Centers are Red Hot" Computer Reseller News n. 833 p. 196, Mar. 1999.*

No Auther listed, "Utah-Based InsureWorld Pioneers Online Auto Insurance" PR Newswire, Mar. 10, 1998.*

Insureworkd website, 1999.*

Burger, K."Network computing becomes a reality for insurers." Insurance & Technology v21n12 pp. 16-18. Dec. 1996. ISSN: 0892-8533; pp. 1-3.*

* cited by examiner

INSURANCE AGENT CONTACT SYSTEM

BACKGROUND OF THE INVENTION

1. Reservation of Copyright

The disclosure of this patent document contains material which is subject to copyright protection. The copyright owner has no objection to the facsimile reproduction by any one of the patent document or the patent disclosure, as it appears in the U.S. Patent and Trademark Office's patent files or records, but otherwise reserves all copyright rights whatsoever.

2. Field of the Invention

The present invention relates to certain types of online systems for providing vendors with contacts.

3. Description of Background Information

Communications systems facilitate the exchange of business information and business transactions based upon such information. With the advent of the Internet and the more frequent use of online systems, vendors and consumers are exchanging information, entering into transactions, and documenting those transactions online. Automated online systems allow a vendor to provide services to a customer at the consumer's behest, while minimizing the cost of a transaction between the vendor and the consumer. They also make it easier to match vendors offering certain services at a specified price with consumers seeking that service at the specified price. Online systems also help find comparable products and services at the lowest price.

Much effort is being expended to improve and optimize online insurance systems. Companies providing online insurance systems include Intuit Insurance Services, Insweb, Progressive, and GeicoDirect, just to name a few. The Intuit Insurance Services' webpage is at www.insuremarket.com, and allows a consumer to obtain life insurance quotes and automobile insurance quotes within minutes. Quotes can also be obtained for other insurance types, such as medical insurance, home insurance, disability income insurance, long-term care insurance, small business insurance, annuities, and supplemental health insurance.

The automobile portion of this site poses a number of questions to a consumer in an online questionnaire. Once the questionnaire is filled out, the consumer can optionally obtain immediate comparative quote information indicating the rates offered by various insurance carriers. The consumer can also obtain agent information for certain insurance carriers.

There is need for improved online automobile insurance systems that can provide a more immediate connection between agents for certain insurance carriers and the consumer. For example, when a consumer obtains a quote by a given insurance carrier, the consumer may wish to pursue the purchase of a policy through an agent for that carrier. However, the consumer may experience inconveniences in contacting the agent, and may need to provide the agent with all of the consumer's information anew.

SUMMARY OF THE INVENTION

The present invention is provided to improve upon systems for exchanging insurance-related information online and for providing related services. In order to achieve this end, one or more aspects of the present invention may be followed in order to bring one or more specific objects and advantages, such as those noted below.

An object of the present invention is to allow consumers to access, through an online system, information concerning automobile insurance policies offered by multiple insurance carriers. A further object is to provide information concerning agents for such insurance carriers, and to allow an immediate follow-up by the agent to the consumer who has expressed an interest in a given policy through the online system.

The present invention, therefore, may be directed to a method or system, or one or more parts thereof, for facilitating the online interaction between consumers and agents of automobile insurance carriers. The system allows an online quoting system to distribute customer contacts electronically to various agent systems. The delivery is online and in real time, and allows agents to have immediate access to customer contact information. All contact information is retained in a database local to the agent contact system, and is not distributed by means such as e-mail. Accordingly, in this fashion, the status of each contact can be controlled, and accurate data can be kept regarding the status of each contact.

The agent contact system comprises an online screen viewable by the agents through their agent systems. In the specific embodiment, the online screen is implemented using a web browser which accesses a web server provided as part of the agent contact system. This can be implemented in the form of an extranet which provides all authorized insurance agents with access to the agent contact system. Contacts are assigned to a given agent in accordance with the actions taken by a customer while interacting with a quoting system. All contacts assigned to a given agent are accessible by that agent's system through the extranet.

In certain aspects of the present invention, an interface is provided to the agents which allows the agents to view a list of contacts sorted by status and date, and to perform actions upon those contacts, including updating various key fields associated with a given contact. The agents will be able to print contacts, change their status, and enter pertinent information about a sale or indicate a reason why a sale could not be completed. All this information is stored in a database local to the agent contact system. Information pertaining to various customers also is used to update a file pertaining to each customer, and therefore to update the personal insurance profile for a given customer. This allows a customer to be able to access his or her insurance information through the quoting system. Agents may be provided with certain requirements to insure that the service given to the customers is at a certain level. For example, each of the agents may be required to contact a contact within 24 hours. Data can be maintained in the local database which indicates whether each agent is complying with these level of service requirements.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE EXEMPLARY EMBODIMENT

Figure 1:
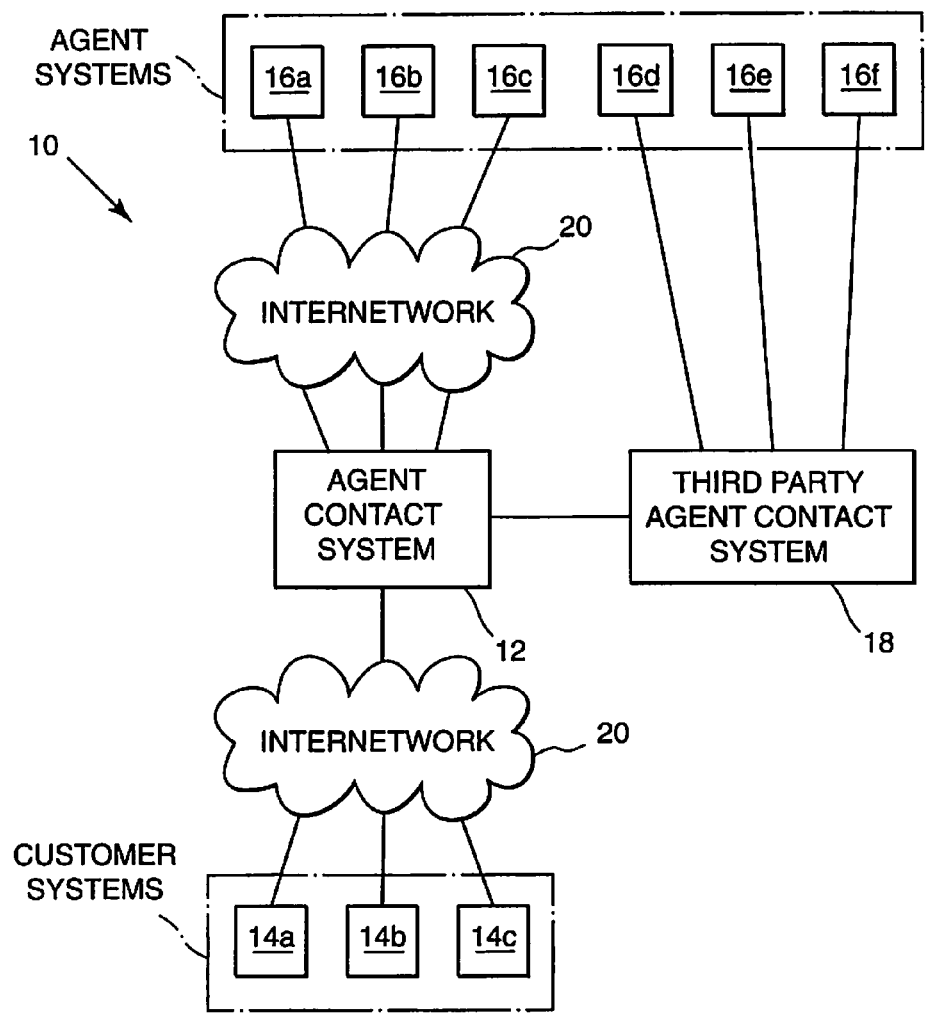
FIG. 1 is a simplified block diagram of an online insurance contact system in accordance with an illustrated embodiment of the present invention.

Referring now to the drawings in greater detail, FIG. 1 shows an online insurance contact system in accordance with the illustrated embodiment of the present invention. An agent contact system 12 is provided which is coupled via an internetwork 20, to a first set of agent systems 16a-16c as well as to a third party agent contact system 18. Third party agent contact system 18 is then coupled to a second set of agent systems 16d-16f. Agent contact system 12 is coupled to a plurality of customer systems 14a-14c via internetwork 20. In the illustrated embodiment, internetwork 20 comprises the Internet. In the illustrated embodiment, each of agent systems 16a-16c and customer systems 14a-14c communicates with agent contact system 12 using web server/browser technology, as is known in the art.

Figure 2:
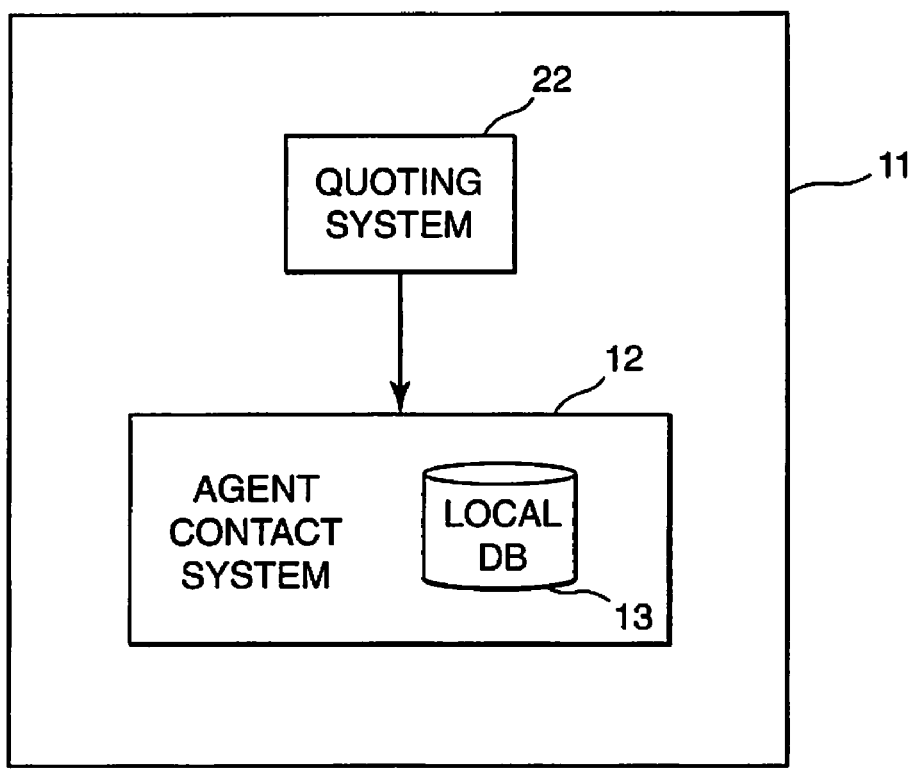
FIG. 2 is a block diagram of a quoting system coupled to an agent contact system in accordance with the illustrated embodiment.

FIG. 2 shows agent contact system 12 coupled to a quoting system 22. As shown in FIG. 2, agent contact system 12 comprises, among other elements, a local database 13. Details regarding quoting system 22 are disclosed in a commonly-assigned patent application entitled "System for Online Quoting and Binding of Insurance Policies," filed in the names of Ser. No. 09/365,245, on even date herewith, the content of which is hereby expressly incorporated herein by reference in its entirety. Quoting system 22 allows customers to input certain customer information and insurance preferences through an online interface, and to obtain agent information through the online interface. Once the customer is provided with this information, the customer can then choose to find out more about a particular policy, or perhaps purchase a policy, and thus want an agent to contact that customer. Accordingly, quoting system 22 is connected to agent contact system 12, which allows for the online real-time delivery of the customer information, and the customer's personal insurance portfolio, to various agent systems 16a-16f.

All contact information is maintained internal to agent contact system 12, and thus is stored in local database 13. The contact information is not distributed to other locations, for example, by e-mail. This allows a single server system 11 to be able to control and monitor customer and contact information as well as information concerning the insurance portfolio of a given customer. The information can be utilized to help increase the quality of services and increase the rate of closures of business transactions between insurance carriers and customers, either directly, or through agents, due to the use of agent contact system 12.

Figure 3:
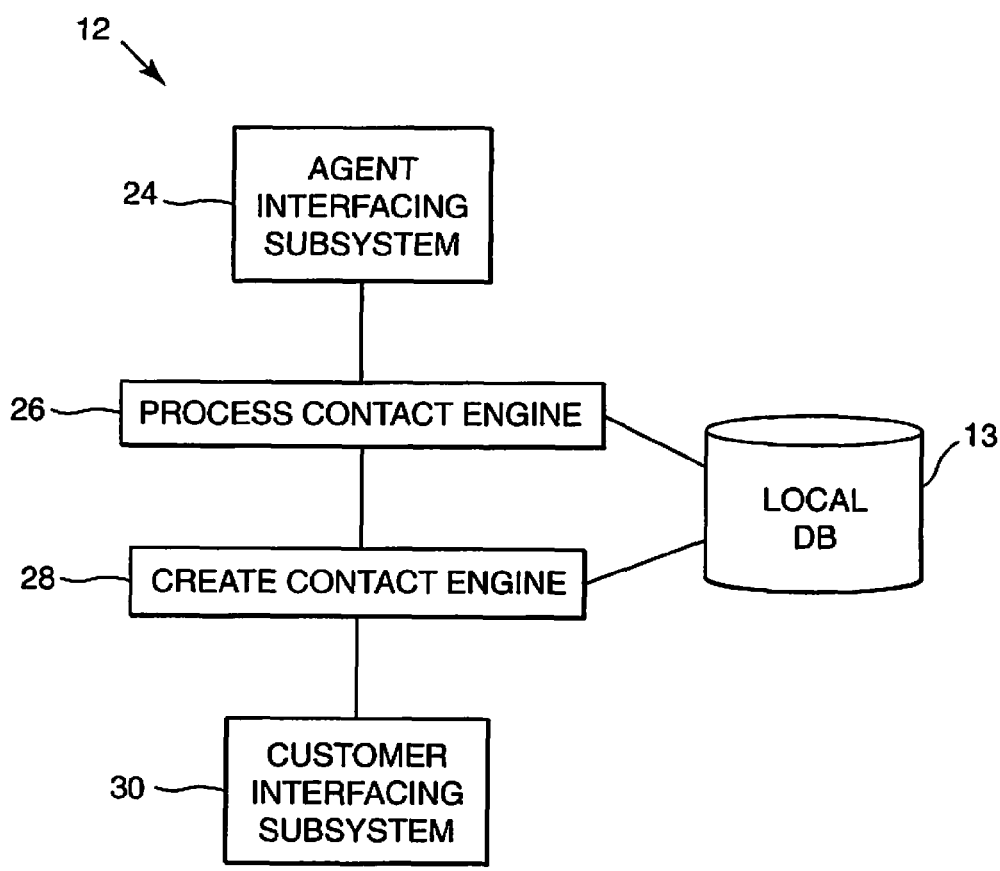
FIG. 3 is a block diagram of the agent contact system illustrated in FIG. 1.

FIG. 3 provides a more detailed block diagram of agent contact system 12. As shown in FIG. 3, agent contact system 12 comprises an agent interfacing subsystem 24, a process contact engine 26, a create contact engine 28, a customer interfacing subsystem 30, and local database 13. Agent interfacing subsystem is coupled to process contact engine, which is coupled to local database 13. Process contact engine 26 is coupled to create contact engine 28, which is coupled to customer interfacing subsystem 30.

Agent interfacing subsystem 24 handles interfacing with agent systems 16a-16c and interfacing with agent systems 16d-16f, via third party agent contact system 18. Customer interfacing subsystem 30 handles interfacing with each of the customer systems 14a-14c.

Create contact engine 28 deals with customers and quoting system 22, in order to create contacts, which will be then processed by process contact engine 26. Once the contact is created, the result is visible to process contact engine 26, which will handle both the delivering of information to the agents via agent interfacing subsystem 24 and the tracking and local storage of that information in local database 13. Generally, process contact engine 26 allows an agent to view, print, and act upon contacts.

Figure 4:
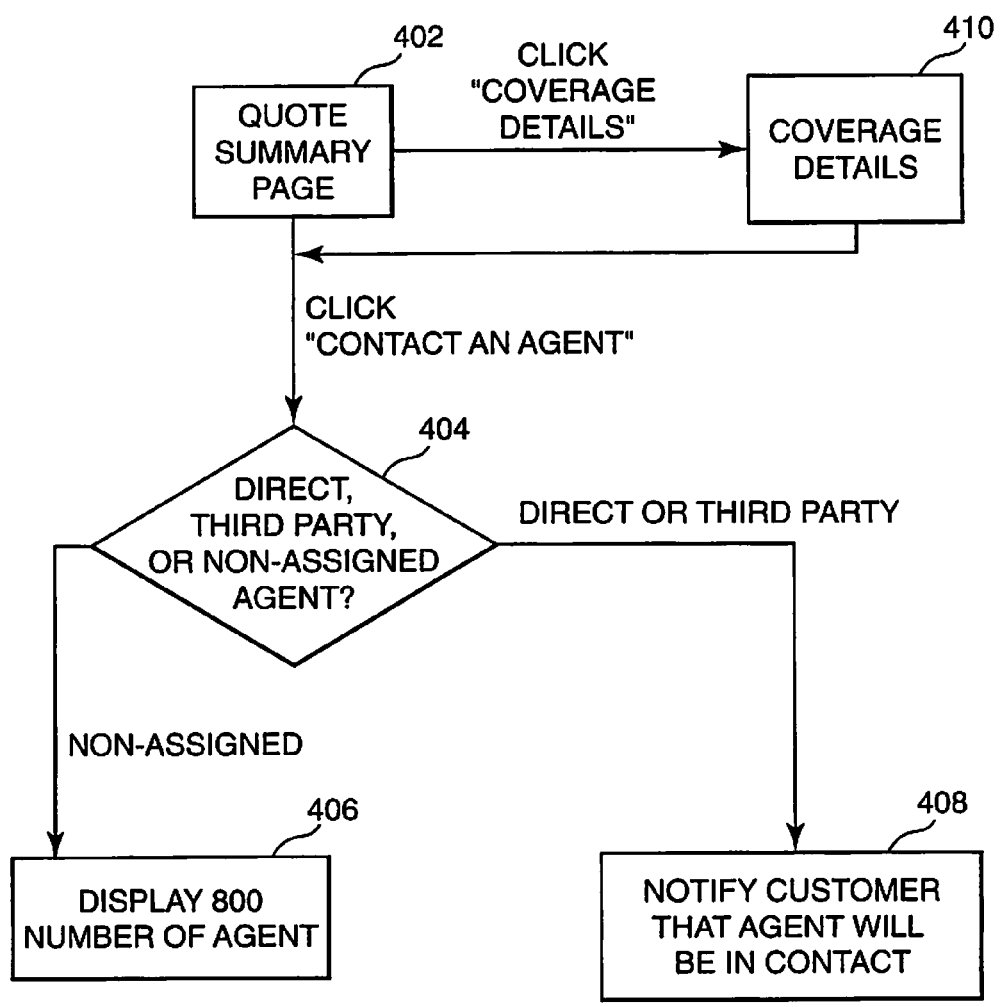
FIG. 4 is a flow diagram representing certain parts of a process performed by a create contact engine during the creation of a contact.

FIG. 4 is a general diagram illustrating the process associated with the creation of a contact. At an initial act 402, a quote summary page is provided to the customer's screen, through the web browser. The customer can click on various icons on that page, including a "coverage details" icon and a "contact an agent" icon. If the customer clicks on "coverage details," the process will proceed to an act 410 at which point the coverage details will be displayed to the customer. The process proceeds from act 410 to act 404. If the icon "contact an agent" is clicked by the customer, the process will proceed to act 404. At act 404, a determination is made as to whether the chosen agent is either a direct or third party agent which can be contacted through the process contact engine, or whether the agent is a non-assigned agent, i.e., an agent not signed up with the system and not having access to agent contact system 12. If the agent is a direct or third party agent, the process proceeds to act 408, where the customer will be notified that the agent will be in contact with that customer. At that point, the customer's PIPO and contact record will be saved locally in local database 13. If the agent is a non-assigned agent, the process will proceed to act 408, and the 800 number of that agent will be displayed.

Figure 5:
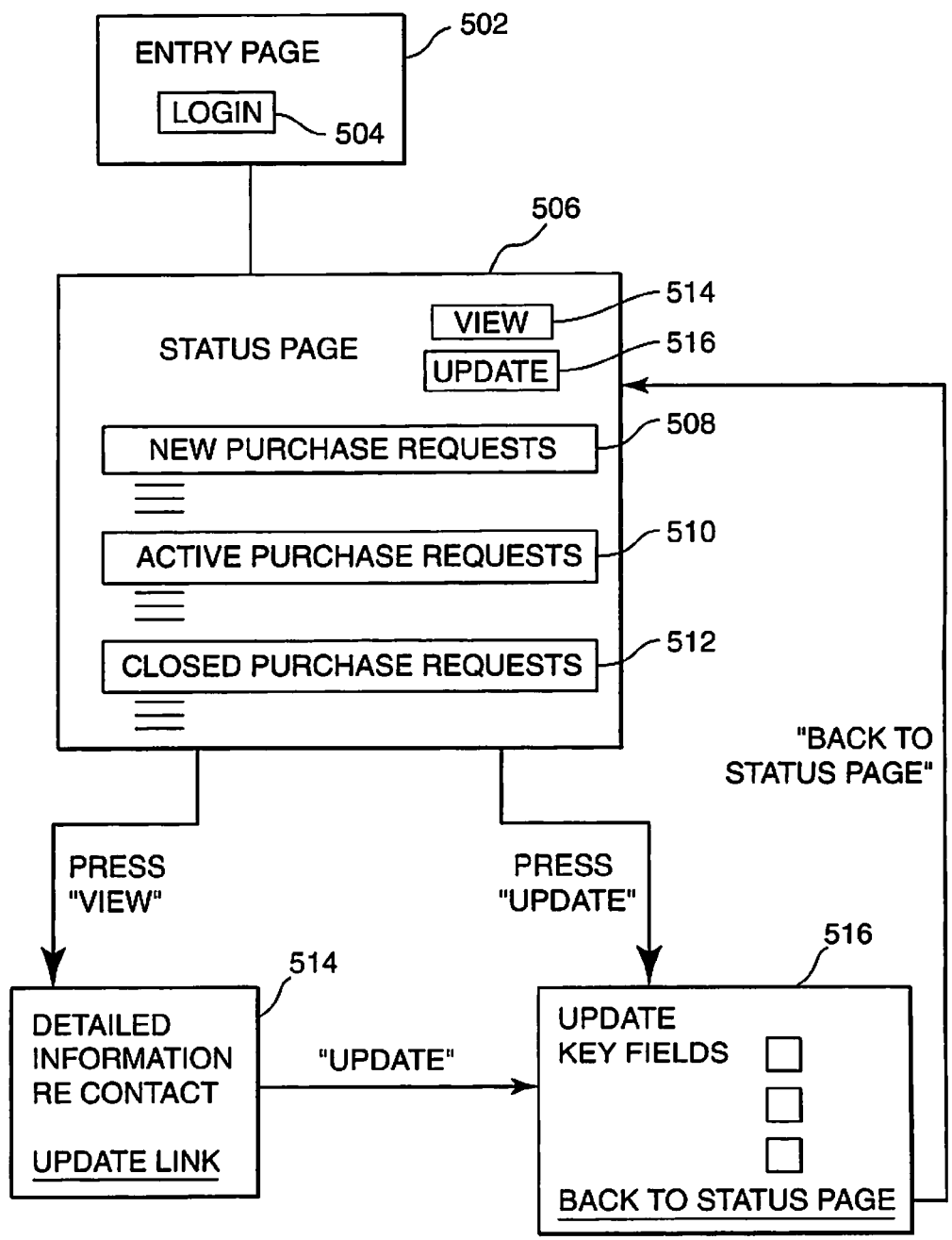
FIG. 5 is a flowchart representing a process related to the processing of contacts.

FIG. 5 is a flowchart generally illustrating the processing performed by process contact engine 26 in processing contacts. The agent may be notified of an individual contact by being sent an e-mail message immediately. The agent can access the agent contact system 12 through the internet using the appropriate URL. The agent will then arrive at an entry page 502, and be provided with certain icons and prompts for logging in, represented by the reference numeral 504 in FIG. 5.

Once the agent logs in, the process will proceed to act 506, at which point the status page will be displayed on the agent's web browser. The status page comprises a number of categories of information, including new purchase requests 508, active purchase requests 510, and closed purchase requests 512. New purchase requests will comprise a list of contacts, while active purchase requests 510 will comprise a list of contacts being processed. Closed purchase requests 512 comprise purchase requests that either resulted in a sale, or resulted in a definite decision by a customer not to purchase the given insurance policy. Each particular contact will have a set of icons corresponding to it, i.e., a view icon 514 and an update icon 516. By clicking on the "view" icon, the process will proceed, for that given contact, to act 514, at which time the agent's browser will show detailed information regarding that contact. If the "update" icon is pressed for a given contact, the process will proceed to act 516, where a display will be provided on the agent's browser allowing certain key fields associated with that contact to be updated. The agent can move from the detailed information page by pressing an update link, which would move the process over to act 516, allowing the agent to update information regarding that particular contact.

Some of the types of key fields that can be changed by the agent include changing the contact status to "sold", entering policy face amount, entering an effective date of a given policy, and inputting term information as well as optional comments. The agent can move from the update page back to the status page 506 by clicking on a link "back to status page." A mechanism is preferably provided (not shown) which refreshes the contact list provided on status page 506 periodically. At any point in time, the agent can exit the browser. If a customer decides not to buy the policy, and this indication is discovered by the agent directly with the customer, the agent can mark the contact as a "no sale" using update page 516, select the reason for the declination of coverage by the customer from a pull-down menu, and exit the screen. If the agent contacts the customer, and the customer is not home, the agent may mark the contact as "called" and enter the date and time for making a follow-up call. At this point, the contact will move from a new purchase request 508 into the category of an active purchase request 510.

Additional features which may be incorporated into the embodiments disclosed herein include the following. The system may be provided with a mechanism for allowing customers to locate specific agents based upon carrier, state, and/or county. This feature will be beneficial because of the possibility of more than one agent existing within any given state for a particular carrier. Agents can be categorized by combining a carrier, state, and county, and may be further categorized in accordance with a zip code.

The contact information, when saved in local database 13, may be associated with agent data. This helps facilitate the ability to display contacts to the agent.

The agents may be notified of their contacts periodically. For example, this may be done on a daily basis. That is, once a day a single e-mail may be forwarded to each agent receiving a new contact on that given day. The e-mail message may specify the number of new contacts received during that day. This helps proactively notify agents about new contacts, which will help the agent determine when it is appropriate or necessary to log on to the agent contact system using the his or her agent system 16.

The agent contact system may be made secure by requiring agents to input a user identification and password before being granted access to any part of the contact system. In addition, each given agent may only be given access to the contacts assigned to that given agent. A different security level may be provided to administrators or users of the agent contact system 12, so that all contacts in the system may be accessed. All contact information stored in database 13 may be grouped either by status or agency name.

Another feature which may be incorporated into the illustrated system is the provision of a mechanism which would allow carrier managers to interface with agent contact system 12, and to reassign certain contacts to other agents. This can be appropriate and helpful where a given agent leaves the program, and thus no longer has access to agent contact system 12. Pending contacts can accordingly be reassigned to a new agent.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, materials, and embodiments, it is understood that the invention is not limited to the particulars disclosed. The invention extends to all proper equivalent structures, mechanisms, acts, and uses such as are within the scope of the appended claims.

What is claimed is:

1. In an online insurance information system comprising an insurance quoting system, an agent contact system, agent systems, and customer systems, said insurance quoting system, said agent contact system, said agent systems, and said customer systems being separate and remote from each other, said agent contact system comprising:

a customer interfacing subsystem, coupled to said insurance quoting system and to a given customer system of said customer systems, for presenting on said given customer system plural different agents representative of different insurance companies from which to choose, the different agents comprising separate agent systems, and for receiving an online indication by a given customer of a desire to pursue a policy with a given agent, said given customer comprising a given contact;

a create contact engine for identifying a given agent system and saving in a database local to said agent contact system a personal insurance profile and contact information corresponding to said given customer;

an agent interfacing subsystem coupled to said given agent system for receiving an online indication by said given agent of a desire to view, print, or modify said contact information; and a process contact engine for contacting said given agent system with information regarding said given contact, and for accessing and modifying said contact information in accordance with online indications made by said given agent.

2. The system of claim 1, wherein said process contact engine comprises a mechanism to inform the given agent system of the given customer through email.

3. The system of claim 1, wherein said agent interfacing system comprises a mechanism to interact with said agent systems via a web-based interface.

4. The system of claim 1, wherein said customer interfacing subsystem comprises a mechanism to receive the online indication by the given customer through a web-based interface.

5. The system of claim 1, wherein said create contact engine comprises a mechanism to identify the given agent based on geographic information of the given customer.

6. The system of claim 5, wherein the geographic information comprises a zip code.

7. The system of claim 1, wherein the insurance policy comprises an automobile insurance policy.

* * * * *